United States Patent Office 3,718,811
Patented Feb. 27, 1973

3,718,811
ELECTRONIC TAXIMETER DEVICE
Carl Ib Peder Larsen, Stenstuegade, Denmark, assignor to
Haldex Aktiebolag, Halmstad, Sweden
Filed July 23, 1971, Ser. No. 165,039
Claims priority, application Denmark, Aug. 12, 1970,
11,027
Int. Cl. G07b 13/00
U.S. Cl. 235—30 R
4 Claims

ABSTRACT OF THE DISCLOSURE

An electronic taximeter comprising circuitry for generation of a single pulse train by an oscillating means constructed so as to emit oscillations in the form of constant frequency pulses applied to charge counter means when the speed of the taximeter carrying vehicle is below a predetermined value, and to emit speedometer governed pulses, obtained by a synchronizing process involving speedometer sensor means feeding triggering pulses to the above-mentioned oscillating means, when the vehicle speed is above the aforementioned value. The pulses are hereby received at a constant rate below this speed and at a variable rate above this speed, and comprise a certain number of pulses per travelled distance applied to the same charge counter means. The electronic circuitry merely changes automatically, and without any pulse loss, the rate of the pulse train applied to the charge counter means and establishes, with reference to the predetermined speed, a time dependent fare below and a distance dependent fare above this speed.

---

The invention refers to taximeter devices more specifically such devices in which time and the way information in the form of electrical impulses is used, on the one hand, for calculation of the fare and, on the other hand, for control registration, such devices normally comprising two impulse sources, one of which produces time reference impulses and the other travelling distance impulses, said device comprising means for treating the impulse information for the purpose of controlling a figure indicating unit showing the fare and the distance travelled under predetermined conditions.

The calculation of the fare performed here is based on regulations made by the authorities concerning both the hire time and driving distance according to particular tariffs. These conditions have been reduced to practice in such a way that the forward stepping of figures for the registration takes place in dependence on the time impulses when the vehicle is at rest or driving slowly whereas the stepping forward at higher velocities takes place in dependence on the distance impulses. The conditions mean that all taximeter construtcions belonging to this type must be provided with devices permitting a change in the registration to occur upon transition between the lower and higher speed from a time-dependent tariff to a distance-dependent one. This should take place instantaneously and at certain given speed.

Taximeter devices operating with electrical impulses are previously known and comprise means for comparing the impulse frequency of the time reference impulses to the frequency of the distance impulses, a determination being made of the impulse sequence supplied to the comparison device having in each case the higher impulse frequency, this impulse sequence being chosen to feed the fare charging means.

The device used in that case and in prior constructions is based on frequency comparison, for example, in one case by using a frequency discriminator and in another case by means of a pulse discriminator. Said frequency discriminator is based on the fact that a phase shift takes place in an L and C (inductance-capacitance) bridge, enabling the higher frequency to be chosen. In the second case the election is made in a flip-flop circuit or gate circuit of the faster impulse series by suppressing impulses occurring between impulses in the compared impulse sequence.

It is a purpose of the present invention to provide improved means for producing an impulse sequence which depending on either time or distance feeds the fare charging means in respect to the above-mentioned pre-determined speed.

The characteristic features of the invention will appear from the attached claims.

Figure 1:
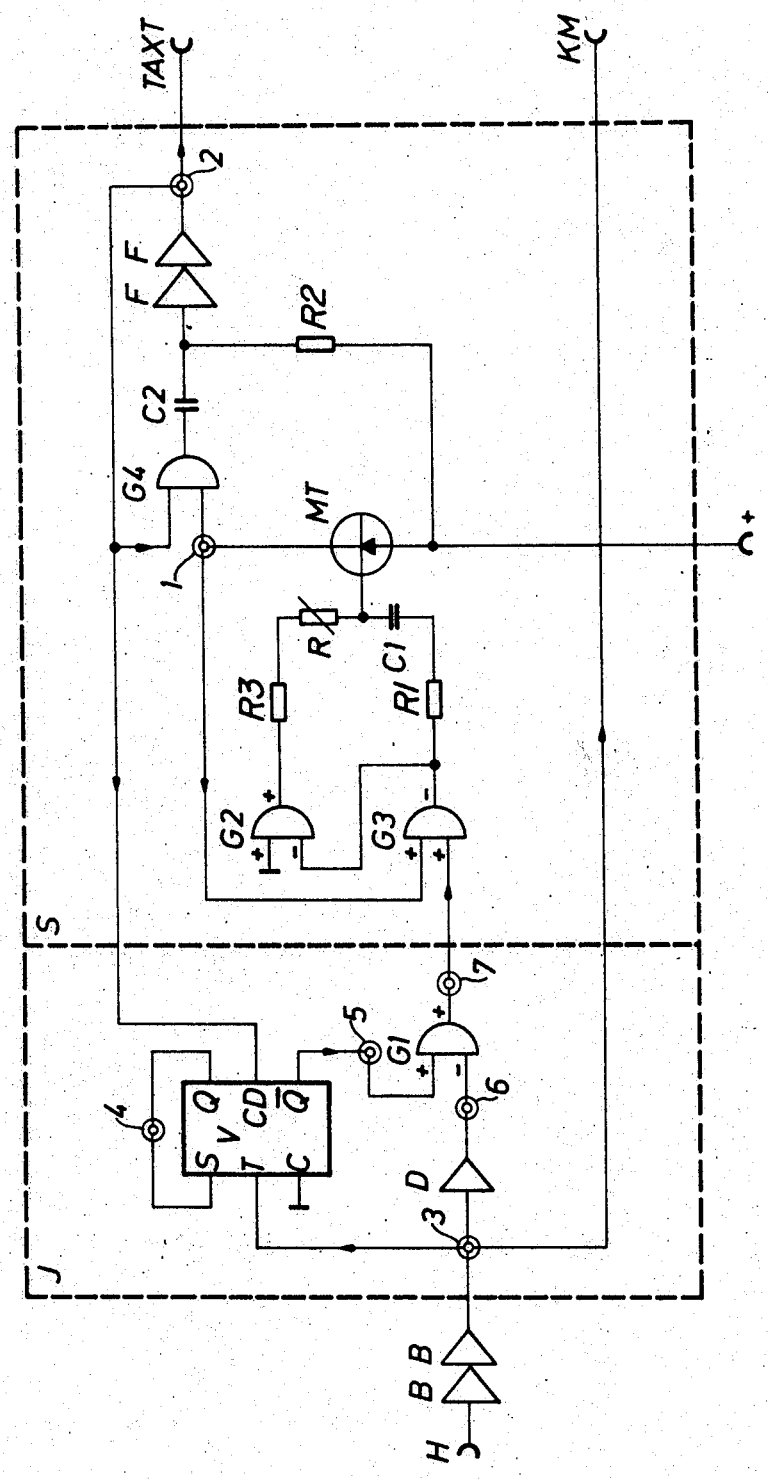
Figure 2:
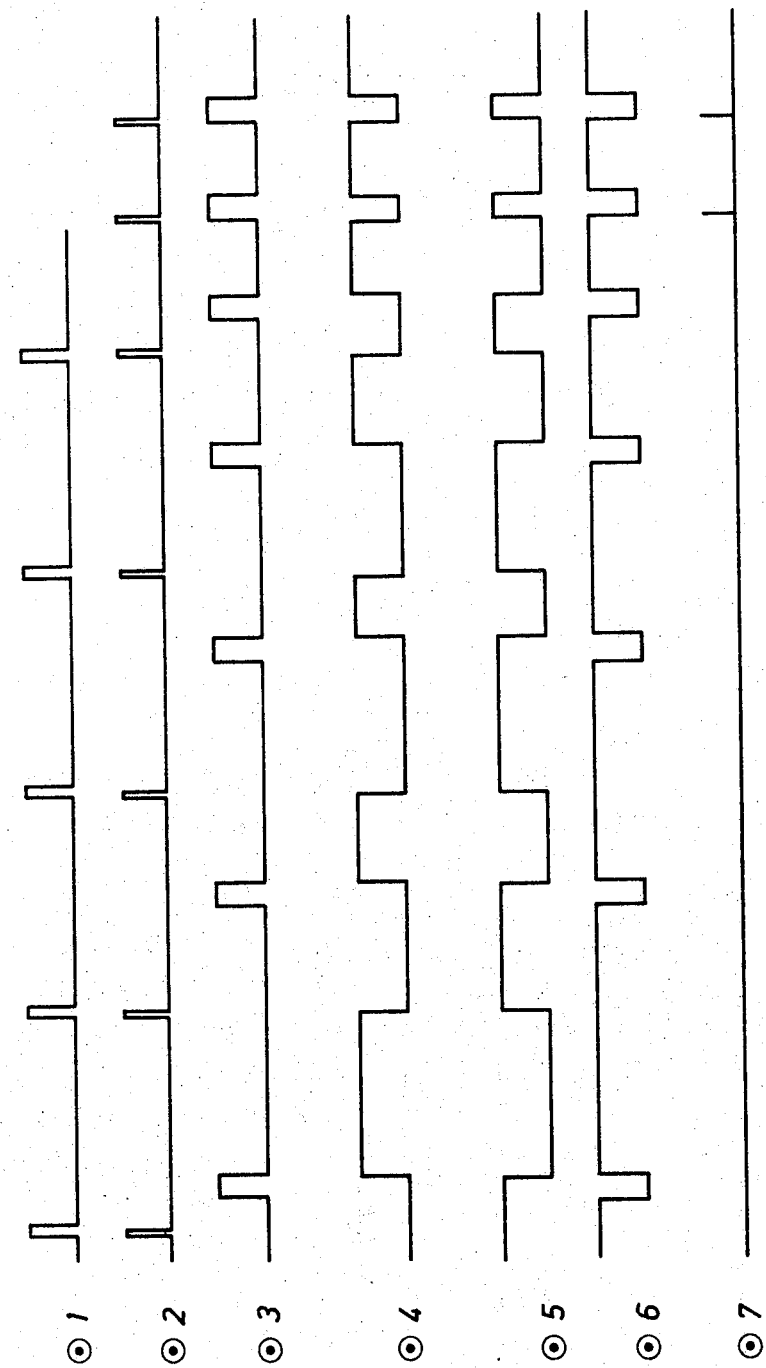

The invention will be described in greater detail by reference to the attached FIGS. 1 and 2. FIG. 1 is a circuit diagram of a device according to the invention. FIG. 2 illustrates the impulse shapes at various points of the device.

As appears from FIG. 1 input T of a flip-flop V is supplied with distance impulses having the waveform according to FIG. 2, diagram 3. The impulses are derived from a distance impulse transmitter H of known construction in which, for example, closure of contacts in relays yields electrical impulses having the shape shown when a cam disc coupled to the wheels rotates during the movement of the vehicle. The impulse density is so chosen that the dissolution in the form of driven distance gives one impulse for every half meter. In order to produce feeding pulses for flip-flop V having a suitable amplitude and sign an amplifier BB of an inverter type is inserted between the distance impulse transmitter H and flip-flop V.

Flip-flop V is a part of a comparison circuit J comprising the flip-flop V proper, an additional inverter D and a gate G1. It is the purpose of the comparison circuit to produce triggering impulses in dependence on the distance impulses when these arrive at a time interval which is shorter than the interval of time determined by a clock S also forming a part of the taximeter. For this reason the flip-flop is supplied with time impulses from the output (TAXT) of the clock via an input CD and with distance impulses via an input T.

The comparison circuit operates in the following way. When a positive distance impulse as applied at input T of flip-flop V the flip-flop is triggered on the rear edge of the instance impulse which means that the flip-flop is triggered by a negative voltage direction. This condition appears from FIG. 2 where waveform 3 illustrates the distance impulses and waveforms 4 and 5 illustrate the output waveforms of the flip-flop at the outputs Q and $\bar{Q}$ respectively. The rear edge of the distance impulse produces a high level on output Q corresponding to wave shape 4 and a low level on output $\bar{Q}$ corresponding to wave shape 5. The condition of the flip-flop will now remain stable until a positive clock impulse, waveform 2, is applied to input CD. Thus the flip-flop will trigger in accordance with the waveforms 4 and 5 such that a low level is produced on output Q and a high level on output $\bar{Q}$. The connection from Q to S insures that V is firmly locked in its state when Q presents a high level, which results in the condition that impulses fed to the input T are only able to shift V's position when Q has a low level. When $\bar{Q}$ has taken a low level and this is fed to one of the inputs of the NOR-gate G1, the next impulse that is fed to the input T will result in a low level on the output of the inverter D, connected to the other input of the NOR-gate G1, and will result in the shifting of output of G1 to a high level, which in turn triggers the clock circuit by the NOR-gate G3 whose output now gets a low level. This, however, only takes place in the case when a clock-pulse has not been forwarded before this, to V's input CD, which would have resulted in V being shifted back to its beginning position so that $\bar{Q}$ would have taken a high level and consequently blocked transmission of impulses to G1. At the moment when the triggering impulse passes to the clock, its output pulse will immediately put V back to its beginning position which causes the trigger impulse to be very short and as a consequence therefore not gain any influence on the particular frequency of the clock. When the impulse width of the outgoing clock impulse, which is fed to input CD of V, is made less than the input T incoming impulses, V will again shift its position when the impulse on T falls to a low level and is then ready to be triggered by the next distance impulse provided it arrives before a clock impulse. As appears from FIG. 2, curves 5 and 6, this will occur only when a distance impulse arrives prior to a clock impulse which corresponds to the second case referred to above. Through this arrangement of the comparison circuit J output impulses are thus obtained from Gate G1 when the distance impulse frequency is higher than the clock impulse frequency as also appears from wave shape 7 in FIG. 2.

The clock or time impulse member S, as shown in FIG. 1, comprises in the first place a multivibrator circuit composed of transistor MT, gates G2 and G3 and a time-determining condenser C1. The condenser C1 is charged through R1, the base emitter junction of the transistor MT and the NOR-gate G3. The discharge time, which is mainly determined by the resistor R, occurs through R3 and the NOR-gate G2. Further, R is adjustable whereby the pulse repetition frequency of the multivibrator may be varied. Due to the fact that the time constants for respectively charging and discharging are essentially different, a pulse shape is obtained on the collector of the multivibrator transistor having the appearance shown in diagram 1, FIG. 2.

The multivibrator operates in the following way. When feed voltage is applied condenser C1 has no charge. The output of gate G3 has a low level and accordingly transistor MT will be strongly conductive because its base is grounded via condenser C1 and it assumes the same potential as the collector. When the transistor is conducting one of the two plus inputs of gate G3 will in addition be supplied with high level and its output is thereby conditioned to be at low level. Gate G2, on the other hand, when supplied with low level on the input will have high level on the output. Through the base-emitter range of the transistor MT condenser C1 is now quickly charged. Due to this, the transistor will cease to be conductive because its base and emitter assume substantially identical potential, both becoming positive. When this happens one input of gate G3 will be supplied with low level and accordingly the gate will reverse and assume a high potential on the output. Thus condenser C1 is supplied with additional positive voltage which causes the base of transistor MT to become more positive than the emitter. Thus the transistor is substantially in cut-off and no base current will flow. When G3 is reversed, gate G2 will also be reversed and its output now assumes a low potential. As no base current now is flowing in the transistor condenser C1 will be discharged over one discharge path, the resistance of which is substantially determined by resistor R. Due to the fact that R is variable the discharge time may be adjusted. When the discharge of C1 has been going on for a predetermined period of time the base of the transistor will conduct through R1. At this moment the transistor will again become conductive and the process is repeated. The condenser C1 is quickly recharged again and waveform 1 shown in FIG. 2 is obtained on the collector of the transistor.

However, through the other input of gate G3 the above mentioned output signal from comparison circuit J may be supplied to the multivibrator. This causes gate G3 to be reversed while the discharge of the condenser C1 is going on and gate G3 will thus have low potential on its output. As appears from the preceding explanations transistor MT will thereby be caused to start conducting again which means that the process is interrupted and re-started. In this way the impulse frequency of the multivibrator will be controlled or synchronised with the impulses supplied to gate G3 from the comparison circuit J.

The multivibrator impulses are transmitted to the output terminal TAXT through a monostable multivibrator consisting of the NOR-gate G4, condenser C2, resistor R2 and the buffer inverter FF whose time constant is less than that of the input impulses fed to the input T. By pulse-shaping, suitable output wave shapes are obtained for actuating, on the one hand, the said input CD of flip-flop V and, on the other hand, the subsequent impulse handling member TAXT of the taximeter device.

A particular output marked KM in FIG. 1 is provided to feed distance indicating means in the taximeter directly with the distance impulses without passing through time impulse member S.

Due to the above described device, according to the invention, the impulses depending on time and distance will be supplied in an unbroken sequence to the impulse handling members of the taximeter device. Thus all drawbacks due to loss of impulses are eliminated. The adjustment of the suitable transition from time tariff to distance tariff is simply performed by adjusting the pulse repetition frequency of the multivibrator by tuning resistor R.

What we claim is:

1. In a taximeter for a taxi for determining a taxi fare: distance sensing means for sensing the distance travelled by the taxi and developing a first pulse train having a pulse frequency varying as a function of the distance travelled per unit time; oscillating means for developing a second pulse train having a predetermined frequency and applying same to an output terminal; comparator circuit means for comparing the frequency of said first and second pulse trains and developing a third pulse train synchronous with said first pulse train when the frequency of said first pulse train is greater than a predetermined value; and means responsive to said third pulse train for temporarily rendering said oscillating means ineffective to develop said second pulse train for the duration of said third pulse train and for developing an output pulse train synchronous with said third pulse train and applying same to said output terminal; whereby the taxi fare may be determined as a function of the pulse train signal at said output terminal.

2. In a taximeter device according to claim 1, wherein said oscillaitng means includes means for selectively varying the frequency of said second pulse train.

3. In a taximeter device according to claim 1, wherein said oscillatng means comprising a resettable free running multivibrator including means for selectively varying the frequency of said multivibrator.

4. In a taximeter according to claim 1, wherein said comparator circuit means comprises an inverter circuit having an input connected to said distance sensing means and having an output, a flip-flop circuit having two stable states and having one output from which a signal is delivered when said flip-flop circuit is in one stable state and another output from which a signal is delivered when said flip-flop circuit is in the other stable state and having three inputs including one input connected to said one output for receiving therefrom said signal to maintain said flip-flop circuit in said one stable state, a second input connected to said oscillating means for receiving therefrom said second pulse train to put said flip-flop circuit into said other stable state, and a third input connected to said distance sensing means for receiving therefrom said first pulse train to change said flip-flop circuit from either stable state to the other, a NOR-gate circuit having one input connected to said other output of said flip-flop circuit and the other input connected to said output of said inverter circuit and having an output; whereby said third pulse train will appear at said output of said NOR-gate circuit when a pulse from said first pulse train is applied to said flip-flop circuit and changes the stable state of same to said one stable state and a following pulse from said first pulse train is applied to said input of said inverter before a pulse from said second pulse train is applied to said second input of said flip-flop circuit.

References Cited

UNITED STATES PATENTS

| | | | |
|---|---|---|---|
| 3,157,352 | 11/1964 | Caywood | 235—30 R |
| 3,209,997 | 10/1965 | Steadman et al. | 235—30 R |
| 3,388,859 | 6/1968 | Kelch et al. | 235—30 R |
| 3,512,706 | 5/1970 | Bruce-Sanders | 235—30 R |

STEPHEN J. TOMSKY, Primary Examiner